US012164467B2

(12) United States Patent
Soon-Shiong

(10) Patent No.: US 12,164,467 B2
(45) Date of Patent: Dec. 10, 2024

(54) EVENT ARCHIVING, SYSTEMS AND METHODS

(71) Applicant: Nant Holdings IP, LLC, Culver City, CA (US)

(72) Inventor: Patrick Soon-Shiong, Los Angeles, CA (US)

(73) Assignee: NANT HOLDINGS IP, LLC, Culver City, CA (US)

( * ) Notice: Subject to any disclaimer, the term of this patent is extended or adjusted under 35 U.S.C. 154(b) by 477 days.

(21) Appl. No.: 17/351,100

(22) Filed: Jun. 17, 2021

(65) Prior Publication Data
US 2021/0311906 A1    Oct. 7, 2021

Related U.S. Application Data

(60) Division of application No. 16/747,527, filed on Jan. 20, 2020, now Pat. No. 11,061,855, which is a
(Continued)

(51) Int. Cl.
*G06F 16/00*      (2019.01)
*G06F 16/11*      (2019.01)
(Continued)

(52) U.S. Cl.
CPC ........ *G06F 16/113* (2019.01); *G06F 16/2272* (2019.01); *G06F 16/41* (2019.01);
(Continued)

(58) Field of Classification Search
CPC .... G06F 16/113; G06F 16/2272; G06F 16/68; G06F 16/58; G06F 16/41; G06F 16/78; H04L 67/10
See application file for complete search history.

(56) References Cited

U.S. PATENT DOCUMENTS 6,711,293 B1   3/2004   Lowe
7,015,831 B2   3/2006   Karlsson et al.
(Continued)

FOREIGN PATENT DOCUMENTS

JP   2004-510255 A   4/2004
JP   2007-129434 A   5/2007
(Continued)

OTHER PUBLICATIONS

Crow, Jeff, et al. "Timeline interactive multimedia experience (time) on location access to aggregate event information." Proceedings of the 10th annual joint conference on Digital libraries. 2010.*
(Continued)

*Primary Examiner* — Nan Hutton
(74) *Attorney, Agent, or Firm* — MASCHOFF BRENNAN; Andrew A. Noble; Elaine K. Lee

(57) ABSTRACT

Method of retrieving event information is presented. Memento objects can be recognized by an archive engine. Based on the recognition, the archive engine obtains information related to the memento object, possibly one or more recognizable features, and uses the information to search for events associated with a timeline that have corresponding tags. The archive engine can then return the event information as a result set to a user.

24 Claims, 3 Drawing Sheets

Related U.S. Application Data continuation of application No. 16/179,821, filed on Nov. 2, 2018, now Pat. No. 10,540,319, which is a continuation of application No. 14/400,547, filed as application No. PCT/US2013/042647 on May 24, 2013, now Pat. No. 10,133,742.

(60) Provisional application No. 61/651,179, filed on May 24, 2012.

(51) Int. Cl.
  *G06F 16/22* (2019.01)
  *G06F 16/41* (2019.01)
  *G06F 16/58* (2019.01)
  *G06F 16/68* (2019.01)
  *G06F 16/78* (2019.01)
  *H04L 67/10* (2022.01)

(52) U.S. Cl.
  CPC ............. *G06F 16/58* (2019.01); *G06F 16/68* (2019.01); *G06F 16/78* (2019.01); *H04L 67/10* (2013.01)

(56) References Cited

U.S. PATENT DOCUMENTS

| | | | |
|---|---|---|---|
| 7,016,532 B2 | 3/2006 | Boncyk et al. | |
| 7,477,780 B2 | 1/2009 | Boncyk et al. | |
| 7,565,008 B2 | 7/2009 | Boncyk et al. | |
| 7,680,324 B2 | 3/2010 | Boncyk et al. | |
| 7,685,175 B2 | 3/2010 | Carroll et al. | |
| 7,716,194 B2 | 5/2010 | Williams et al. | |
| 7,725,492 B2 | 5/2010 | Sittig et al. | |
| 7,831,599 B2 | 11/2010 | Das et al. | |
| 8,139,900 B2 | 3/2012 | Gokturk et al. | |
| 8,189,880 B2 | 5/2012 | Wen et al. | |
| 8,260,674 B2 | 9/2012 | David | |
| 8,694,357 B2 | 4/2014 | Ting et al. | |
| 10,133,742 B2 | 11/2018 | Soon-Shiong | |
| 10,540,319 B2 | 1/2020 | Soon-Shiong | |
| 11,061,855 B2 | 7/2021 | Soon-Shiong | |
| 2004/0107270 A1 | 6/2004 | Stephens et al. | |
| 2006/0155757 A1* | 7/2006 | Williams | G06F 16/447 707/E17.022 |
| 2006/0251338 A1* | 11/2006 | Gokturk | G06F 16/5854 707/E17.022 |
| 2007/0008321 A1 | 1/2007 | Gallagher et al. | |
| 2010/0216491 A1* | 8/2010 | Winkler | G06Q 50/32 455/457 |
| 2010/0223276 A1* | 9/2010 | Al-Shameri | G06V 20/13 707/769 |
| 2011/0099199 A1 | 4/2011 | Stalenhoef et al. | |
| 2013/0073995 A1* | 3/2013 | Piantino | G06F 16/447 715/764 |
| 2013/0204675 A1* | 8/2013 | Dobell | G06Q 10/06398 705/7.42 |

FOREIGN PATENT DOCUMENTS

| | | |
|---|---|---|
| JP | 2007-280309 A | 10/2007 |
| JP | 2010-118056 A | 5/2010 |

OTHER PUBLICATIONS

Gao, Lianli, and Jane Hunter. "Publishing, linking and annotating events via interactive timelines: an earth sciences case study." CEUR workshop proceedings. vol. 779. Rheinisch-Westfaelische Technische Hochschule Aachen, 2011.*

International Search Report and Written Opinion issued in International Application No. PCT/US2013/042647 dated Aug. 30, 2013, 12 pages.

European Search Report issued in European Patent Application No. 13794602.6 dated Dec. 18, 2015, 9 pages.

Office Action issued in Korean Patent Application No. 10-2014-7032443 dated Dec. 18, 2015, 5 pages.

Office Action Issued in Japanese Patent Application No. 2015-514220 dated Dec. 1, 2015, 6 pages.

Reardon, "Verizon unveils 'Viewdini' video service for mobile devices," http://www.cnet.com/news/verizon-unveils-viewdini-video-service-for-mobile-devices/, 6 pages.

Mjverberg et al., "Two novel motion-based algorithms for surveillance video analysis on embedded platforms," http://dx.doi.org/10.1117/12.851371, Real-Time Image and Video Processing, SPIE 7724, 2010, 10 pages.

Office Action issued in Korean Patent Application No. 10-2014-7032443 dated Jul. 27, 2016, 4 pages.

Office Action issued in Japanese Patent Application No. 2015-514220 dated Jul. 19, 2016, 6 pages.

Office Action issued in Korean Patent Application No. 10-2016-7029701 dated Jan. 16, 2017, 5 pages. .

Office Action issued in Korean Patent Application No. 10-2016-7029701 dated Jul. 31, 2017, 4 pages.

Office Action issued in Korean Patent Application No. 10-2016-7029701 dated Oct. 10, 2017, 7 pages.

Office Action issued in Japanese Patent Application No. 2016-224128 dated Nov. 28, 2017, 10 pages.

Office Action issued in Korean Patent Application No. 10-2016-7029701 dated Jun. 28, 2018, 6 pages.

Thudt et al., "Visual Mementos: Reflecting Memories with Personal Data," IEEE Transactions on Visualization and Computer Graphics, vol. 22, No. 1, 10 pages.

Zajega et al., "Medianeum: Crafting Interactive Timelines From Multimedia Content," QPSR of the Numediart Research Program, vol. 5, No. 2, Jun. 2012, 7 pages.

Peesapati et al., "Pensieve: Supporting Everyday Reminiscence," Proceedings of the SIGCHI Conference on Human Factors in Computing Systems, 2010, pp. 2027-2036.

Office Action issued in Japanese Patent Application No. 2016-224128 dated Oct. 2, 2018, 8 pages.

Extended European Search Report issued in European Patent Application No. 19203605.1 dated Nov. 15, 2019, 10 pages.

Office Action issued in Japanese Patent Application No. 2019-014985 dated Mar. 31, 2020, 11 pages.

Office Action issued in European Application No. 19 203 605.1 dated November 13, 2020, 4 pages.

Office Action issued in Japanese Patent Application No. 2019-014985 dated Nov. 24, 2020, 4 pages.

* cited by examiner

EVENT ARCHIVING, SYSTEMS AND METHODS

This application is a divisional of U.S. application Ser. No. 16/747,527 filed Jan. 20, 2020, which is a continuation of U.S. application Ser. No. 16/179,821 filed Nov. 2, 2018, which is a continuation of U.S. application Ser. No. 14/400,547 filed Nov. 11, 2014, which is a U.S. National Phase Application of International Application No. PCT/US2013/042647 filed May 24, 2013, which claims the benefit of priority to U.S. provisional application 61/651,179 filed May 24, 2012. These and all other extrinsic materials discussed herein are incorporated by reference in their entirety.

FIELD OF THE INVENTION

The field of the invention is information archiving technologies.

BACKGROUND

Recently Facebook® introduced the concept of a timeline where user information is organized according to when the information entered Facebook or based how a user links information to the timeline. Such an organization of information can be useful to the users by allowing them to review time-related events in their life. Unfortunately, the information stored in the Facebook timeline is inaccessible without Facebook and lacks any mechanism by which a user can be reminded of the information available.

Some effort has been directed to archiving information for later retrieval. For example, U.S. patent application 2004/0107270 to Stephens et al. titled "Method and System for Collaboration Recording", filed Oct. 27, 2003, describes a system where collaboration sessions are archived. Such an approach is useful for collaboration in communication sessions. However, the Stephens system also fails to provide memory cues to individual users.

Effort has also been directed to recognizing objects. For example co-owned U.S. patents to Boncyk et al. U.S. Pat. No. 7,016,532 titled "Image capture and identification system and process" filed Nov. 5, 2001; U.S. Pat. No. 7,477,780 titled "Image capture and identification system and process" filed May 20, 2004; U.S. Pat. No. 7,680,324 titled "Use of image-derived information as search criteria for internet and other search engines" filed Aug. 15, 2005; and U.S. Pat. No. 7,565,008 titled "Data capture and identification system and process" filed Jan. 26, 2005, describe various aspects of recognizing objects and returning content information based on the recognized object. However, these patents also fail to provide insight into binding interesting events to a person's timeline.

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

Ideally people or other entities could archive events and have mementos that can be used to recall the events. Thus, there is still a need for archival systems capable of triggering or restoring memories to users.

SUMMARY OF THE INVENTION

The inventive subject matter provides apparatus, systems and methods in which one can track one or more events in their lives according to a timeline and retrieve information related to the event via a memento. One aspect of the inventive technology includes a method of retrieving event information. Contemplated methods allow users to access an event archive engine via one or more interfaces (e.g., cellphone, API, browser, social network, search engine, etc.). The archive engine is preferably configured to receive an event object, possibly over a network, where the event object comprises data representative an occurrence in a life of an entity (e.g., a person, animal, pet, building, vehicle, or other item). For example, the method can include the archive engine receiving a video of a concert captured by a user's cell phone where the video can be considered the event object. The archive engine can also bind the event object to a timeline associated with the entity where the timeline represents multiple event objects organized by time. Yet another step of the method includes selecting one or more event objects to be bound, or associated with a memento object. The archive engine can register the memento object with the event objects by mapping one or more recognizable features, possibly via intermediary indexing information, of the memento object to the select event objects. The archive engine is capable of retrieving the selected events through deriving one or more derived features from a digital representation of the memento object and using the derived features as basis to search for the selected events.

Various objects, features, aspects and advantages of the inventive subject matter will become more apparent from the following detailed description of preferred embodiments, along with the accompanying drawing figures in which like numerals represent like components.

DETAILED DESCRIPTION

It should be noted that while the following description is drawn to a computer/server based event archiving system, various alternative configurations are also deemed suitable and may employ various computing devices including servers, interfaces, systems, databases, agents, peers, engines, controllers, or other types of computing devices operating individually or collectively. One should appreciate such terms are deemed to represent computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including retrieving event information based on recognition signals sent to an archival engine.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within a networking context, the terms "coupled to" and "coupled with" are also used euphemistically to mean "communicatively coupled with".

Figure 1:
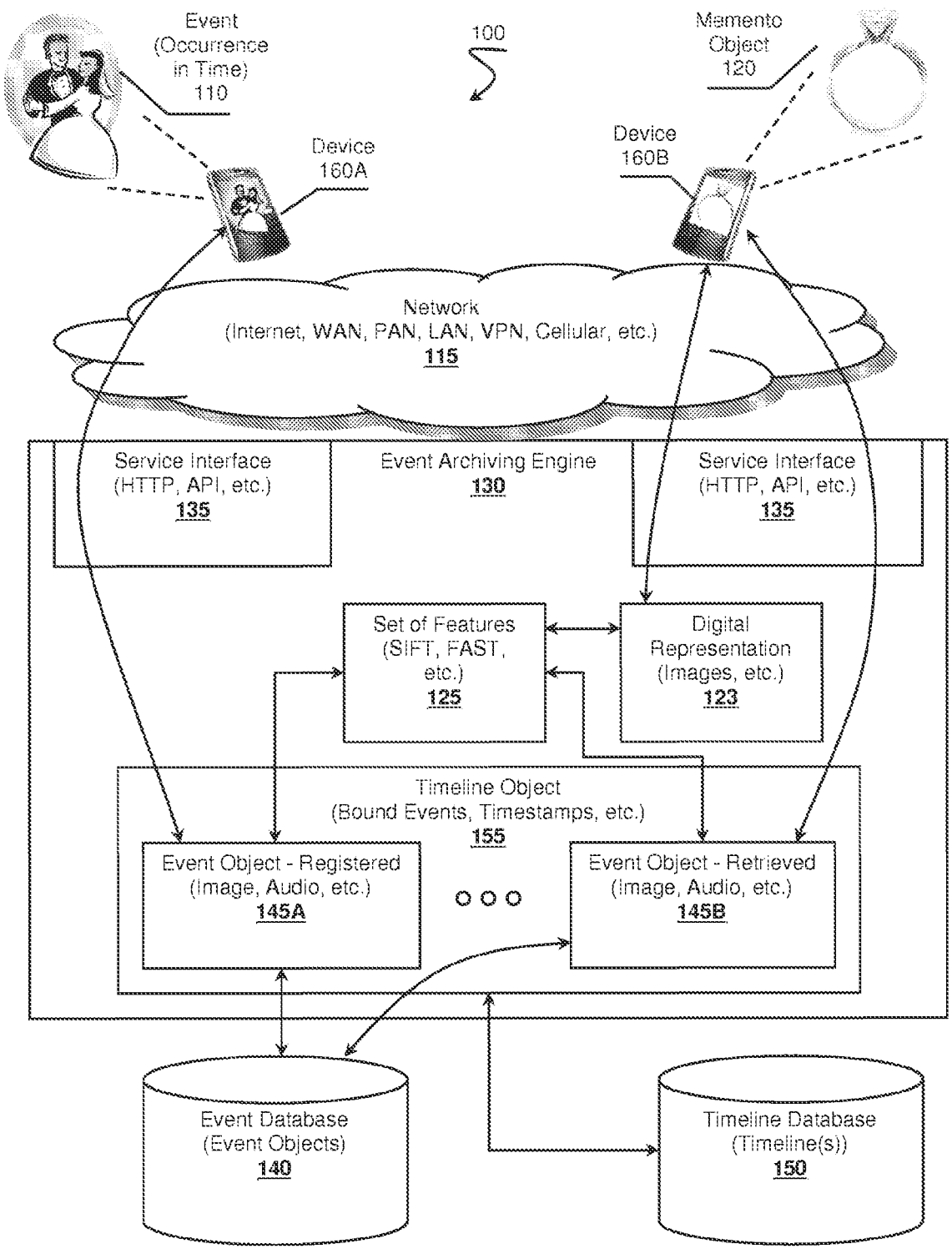
FIG. 1 illustrates a schematic for event archiving ecosystem.

FIG. 1 illustrates archival system 100 comprising event archiving engine 130 configured to or programmed to store one or more event objects 145A through 145B according to a timeline. Examples of computing platforms that can be suitably adapted for use with the inventive subject matter include search engines, social networking sites, on-line communities, CRM databases, source control engines, forums, product review sites, on-line gaming platforms, multiplayer on-line games, or other computing systems that store information.

The following discussion describes event archiving engine 130 as providing access to event-memento for-fee services over a network 115 where event archiving engine 130 comprises one or more servers possibly operating as a Platform-as-a-Service (PaaS), Infrastructure-as-a-Service (IaaS), Software-as-a-Service (SaaS), or other type of platform. However, one should appreciate that event archiving engine 130 could represent other computing devices including a cell phone, a personal computer, a tablet, or other device. Thus, in some embodiments, a user can install an app on their smart phone where the app programs the cell phone to operate as event archiving engine 130.

In the example shown, a user of device 160A captures data of event 110 representing an occurrence in time. For example, an individual might be attending a wedding or sporting event where they use a camera on their cell phone to capture an image, or other content, of the wedding or sporting event. Content related to event 110 captured by device 160A can be submitted to event archiving engine 130, possibly over network 115 (e.g., network connection. Internet, LAN, WAN, VPN, PAN, etc.). In the example shown, device 160A is illustrated as a cell phone. However, other types of devices could also operate as device 160A including a tablet, a computer, a security camera, or other sensor device. Further, the content representative of event 110 comprises a broad spectrum of data modalities including image data, video data, audio data, speech data, motion data, acceleration data, temperature data, text data, biometric data, or other types modalities of data. Event archiving engine 130 receives the content related to event 110 over service interface 135 (e.g., cellular interface, GUI, API, HTTP server, etc.) and instantiates one or more of event objects 145A through 145B, collectively referred to as event objects 145.

Even archiving engine 130 stores occurrences during a person's life as event objects 145 where event objects 145 comprise data representative of the occurrence or event 110. Each event object 145 can be considered a distinct manageable object relative to other objects in the system. For example, event object 145 can be considered an image, a video, or other types of data that can be captured as discussed above along with any additional content. Event objects 145 can also include metadata (e.g., attributes, properties, characteristics, etc.) that describes the nature of the event or occurrence. In some embodiments, a user might select an image from a local computing device, perhaps device 160A, and upload the image file to event archiving engine 130 via service interface 135 (e.g., FTP). The user can then instruct event archiving engine 130 to instantiate event object 145A from the image file and from any additional provided content (e.g., time stamps, comments, etc.). Providing metadata allows event archiving engine 130 to manage, analyze, retrieve, or otherwise manipulate event objects 145. In order to manage event objects 145 with respect to time, event objects 145 can include one or more time stamps that allow the archive engine to organize event objects 145 based on time to construct a timeline as represented by timeline object 155.

Event objects 145 comprise a wide variety of data types. Preferred event objects comprise a media object or possibly a multi media object. Example data types that can be incorporated into an event object 145 includes: audio data, video data, image data, motion data, acceleration data, temperature data, location data, time data, metadata, identification data, preference data, game data, sensor data, security data, or other types of data.

For further clarity with respect to event objects 145, event objects 145 can be considered a representation of one or more events or occurrences that can be "recalled" or "remembered". Example occurrences that can be archived or retrieved can include a party, a concert, a sporting event, a news event, a project task, an accident, or other types of occurrence. In some embodiments, event objects 145 can be automatically categorized based on contextual ambient data (e.g., sensor data) or based on users-supplied data (e.g., a calendar).

As an example of contextual auto creation of event objects 145, consider a scenario where a person is attending a wedding. Event archiving engine 130 can obtain a data feed from the person's cell phone where the data feed includes geo-location data from GPS sensor, timestamp data, video data, user ID (e.g., phone number, IP address, email address, user name, etc.) or other sensor feed data. Event archiving engine 130 receives the data feeds possibly along with external information available from other sources. For example, the external information could include entries within the person's calendar having text of the form "Attend Wedding". The data feeds and external information can automatically trigger instantiation of one or more of event object 145. A corresponding wedding event object could include the time of the wedding, location of the wedding, and one or more portions of content that commemorate the occurrence. Thus, event archiving engine 130 can include one or more rules sets stored in memory that include contextual triggering criteria that cause occurrence content to be instantiated as an event object 145.

Event objects 145 can be stored in event database 140. Event database 140 can be housed within device 160A, within event archiving engine 130, external to both devices, or can be disposed at remote locations over network 115. In some embodiments, event database 140 can be part of a search engine, CRM system or other type of data retrieval system.

Even archiving engine 130 can also manage timelines as distinct objects represented by timeline object 155 where a timeline comprise time-ordered event objects 145. Thus, the timeline objects 155 can represent interesting events that occurred during a person's life. One should appreciate several points. First, a timeline can be segmented as desired. Example segmentations can include segmenting the timeline based on stages of life, a year, a month, a day, or other time spans or criteria. Second, a timeline can be associated with any entity, possibly including a pet, a person, a place, a building, a vehicle, company, an animal, an organization, a group, a family, a school, a yearbook, or other type entity. Third, timeline objects 155 can include their own attributes by which they can be organized, managed, analyzed, or otherwise manipulated. For example, timelines can be distinguished by location information or user identification information. In such a case, event archiving engine 130 could provide a demographic analysis of all timeline objects 155 that are involved with a GPS coordinate or could give rise to a space-time line where the timeline is organized by spatial or location coordinates as well as timestamp coordinates.

Similar to event objects 145, timeline objects 155 can be stored in timeline database 150 where timeline objects 155 can be retrieved. As event archiving engine 130 processes event objects 145, event archiving engine 130 can query timeline database 150 to retrieve desired timeline objects 155 based on one or more timeline attributes (e.g., user ID, geo-location, type of timeline, etc.).

As illustrated, event objects 145 can be associated with one or more memento objects 120, which can be leveraged by a user to retrieve event object 145 or information associated with event object 145. Event archiving engine 130 can select one or more event objects 145 to be linked or registered with memento object 120 according to different techniques. In some scenarios, event objects 145 are randomly selected, possibly where event objects 145 that fall within a time span on the timeline or based on a geo-location attribute value. In other embodiments, event objects 145 can be selected through preferences, user selection, voting, ranking, or other techniques.

Memento objects 120 can include a broad spectrum of objects including 2D objects (e.g., an image, photograph, card, poster, etc.), a 3D object (e.g., a physical thing, a figure, a car, etc.), or even a 4D object (e.g., a figure that moves, time varying object, objects with multiple dimensions of relevance, etc.). Preferably memento objects 120 can be recognized by event archiving engine 130 based on digital representation 123 of memento object 120. Digital representation 123 can comprise various forms of digital data includes image data, video data, audio data, sensor data, or other data modalities. Example techniques that can be used to recognize objects that can be adapted for use with the inventive subject matter include those disclosed in co-owned U.S. Pat. Nos. 7,016,532; 7,477,780; 7,680,324; and 7,565,008.

Event archiving engine 130 registers one or more sets of recognizable features 125 of memento object 120 with selected event objects 145. In the example shown, event object 145A is registered and later retrieved as event object 145B. Device 160B, which could be the same device as device 160A, captures an image of a wedding ring that is to be memento objects 120. Digital representation 123 comprises the image and is analyzed by event archiving engine 130, possibly according type of data, to generate set of features 125. Set of features 125 then becomes indexing information for event object 145A and is registered with memento object 120 within timeline object 155. At a later time when event archiving engine 130 encounters at least a portion of set of features 125 again, event archiving engine 130 can retrieve event object 145B and return corresponding "remembered" information to device 160B.

Consider another example use case where memento object 120 comprises a Christmas card. Engine 130 can analyze features of the card to generate a set of recognizable features 125 (e.g., size, shape, dimensions, color, SIFT features, bar codes, encoded data, non-encoded data, descriptors, font, color histogram, or other attributes). The features can then be registered with event objects 145 that correspond to the previous Christmas, for example. The set of recognizable features 125 can used to generate indexing information for event objects 145. In some embodiments the recognizable features or values are used as the index while in other embodiments, the recognizable features are used as a basis for recognizing memento object 120 as a valid memento object. The valid memento object can then be associated with indexing information to access relevant event objects 145 within timeline object 155.

Archiving engine 130 can retrieve one or more event objects 145 by analyzing digital representation 123 of memento object 120 to derive one or more sets of features 125. To continue the previous example, a person that receives the Christmas card can image the card with their cell phone (e.g., device 160B). The card has been previously "activated" so that archiving engine 130 recognizes the card via set of features 125, which can include derived features corresponding to one or more of the recognizable features of memento card object; possibly within a calculated confidence level. Archiving engine 130 uses the set of features 125, or other information related to the recognized memento object, to find corresponding event objects 145B. Event objects 145 can then be presented on output device 160B (e.g., cellphone, browser, kiosk, appliance, television, etc.).

One should appreciate that set of features 125 are derived from digital representation 123 of memento object 120 rather than event 110. This approach provides for registering set of features 125 from memento object 120 with event object 145A within timeline object 155. When archiving engine 130 encounters similar features again, it can retrieve the registered event object as represented by event object 145B. Thus, memento object 120 serves as the basis for "remembering" or "recalling" event 110.

A suitable technology for retrieving or presenting event objects 145 that can be adapted for use with the presented subject matter includes Verizon® Viewdini™, which allows for searching or retrieve streamed content (see URL news-.cnet.com/8301-1023_3-57439056-93/verizon-unveils-viewdini-video-service-for-mobile-devices/). Viewdini can be augmented to allow it to recognize features of memento object 120 to retrieve event objects 145. Viewdini can be adapted to present timeline information as a series of available streamed events to the user. Further, upon recognition of memento object 120, Viewdini can be adapted to jump to a specific event object 145 on the timeline and provide "time shifting" capabilities to allow the user to shift their reference point on the timeline by moving to relatively earlier times or future times. For example, to time shift a person can shift memento object 120 to various positions or orientations with respect to the field of view of device 160B. Perhaps placing memento object 120 on the right side of the field of view might cause archiving engine 130 to fast forward through event objects 145 in timeline object 155. Similarly, placing memento object 120 near the left side of the field of view could cause archiving engine 130 to rewind back through event objects 145 in timeline object 155. Still further, one could jump from one timeline object 155 to another based on the content presented in event objects 145. For example, if two people are presented in a video event object, the interface can allow the user to jump to a timeline associated with some or all of the people in the video.

Archiving engine 130 can obtain or otherwise receive content related to event 110 used to instantiate event objects 145 through numerous techniques. In some scenarios, the event content can be pushed to archiving engine 130 from capturing device 160A. Alternatively, archiving engine 130 can pull event content from capturing device 160A. Still further archiving engine 130 can automatically retrieve event content, possibly over network 115, on periodic basis or other triggering condition. Such an approach allows for automatic construction of timeline object 155 with minimal user interactions; assuming proper authorization is granted.

One should appreciate that event objects 145 can be bound to more than one timeline object 155. For example, a video of a birthday party might include images of several individuals. Archive engine 130 can recognize the individuals, or other objects in the video or event content, and determine if the individuals have their own timelines. If so, assuming properly authorization, archiving engine 130 can bind event object 145A to the timelines of the recognized individuals.

Although the disclosed subject matter is presented with respect to a central archiving engine, one should appreciate that the various roles or responsibilities of the engine can be distributed among multiple devices. For example, a cellphone can operate as a recognition engine to derive set of features 125 from memento object 120. Further, engine 130 can be distributed across multiple computing devices including multiple search engines, network infrastructure equipment (e.g., switches, routers, etc.), device 160A or 160B, social network services, cloud services, set top boxes, gaming devices, or other devices.

Consider a use-case where a person attends a concert or other event. The user captures data associated with the concert through their smart phone. The captured information could include a recording of conversations, video of the band, images of friends, or other event content. The captured data can integrate into event objects 145 via archiving engine 130. Archiving engine 130 assigns the event content data, possibly based on time stamps, to the user's timeline. Further, archiving engine 130 can assign some, or all, of the event content data to the venue's timeline if location data is available. In some embodiments, the user could also capture an image of their concert ticket to register the ticket as memento object 120 for event 110. In the future, whenever the user images the ticket again, they can quickly recall the event information (e.g., conversation, video, images, etc.).

It is also contemplated memento objects can be produced by a memento service (e.g., a 3D printer, CNC machine, a manufacturing web site, etc.) connected with archiving engine 130 or that owns or operates archiving engine 130. The memento service can use event data to construct or manufacture memento objects 120 based event objects 145 in timeline object 155. For example, perhaps for a child's birthday, a set of "trading cards" can be manufactured where each card corresponds to an event during the last year of the child's life thereby forming a "year in review". Each trading card can be activated (e.g., registered set of features 125 to memento object 120) to allow a person to obtain the corresponding event data by capturing an image of the card. The cards can include images obtained from the corresponding events. Another example could include production of a keepsake, possibly a doll, an action figure, a charm, a plate, jewelry, game token, or other type of items. In some embodiments, multiple individuals might receive the same memento object 120; the same charm for example. In such cases, event objects 145 or timeline objects 155 can be differentiated based on additional information available to the system including user identification, location, device identification, or other factors. Alternatively, each duplicate memento object simply points to the same event objects.

Figure 2:
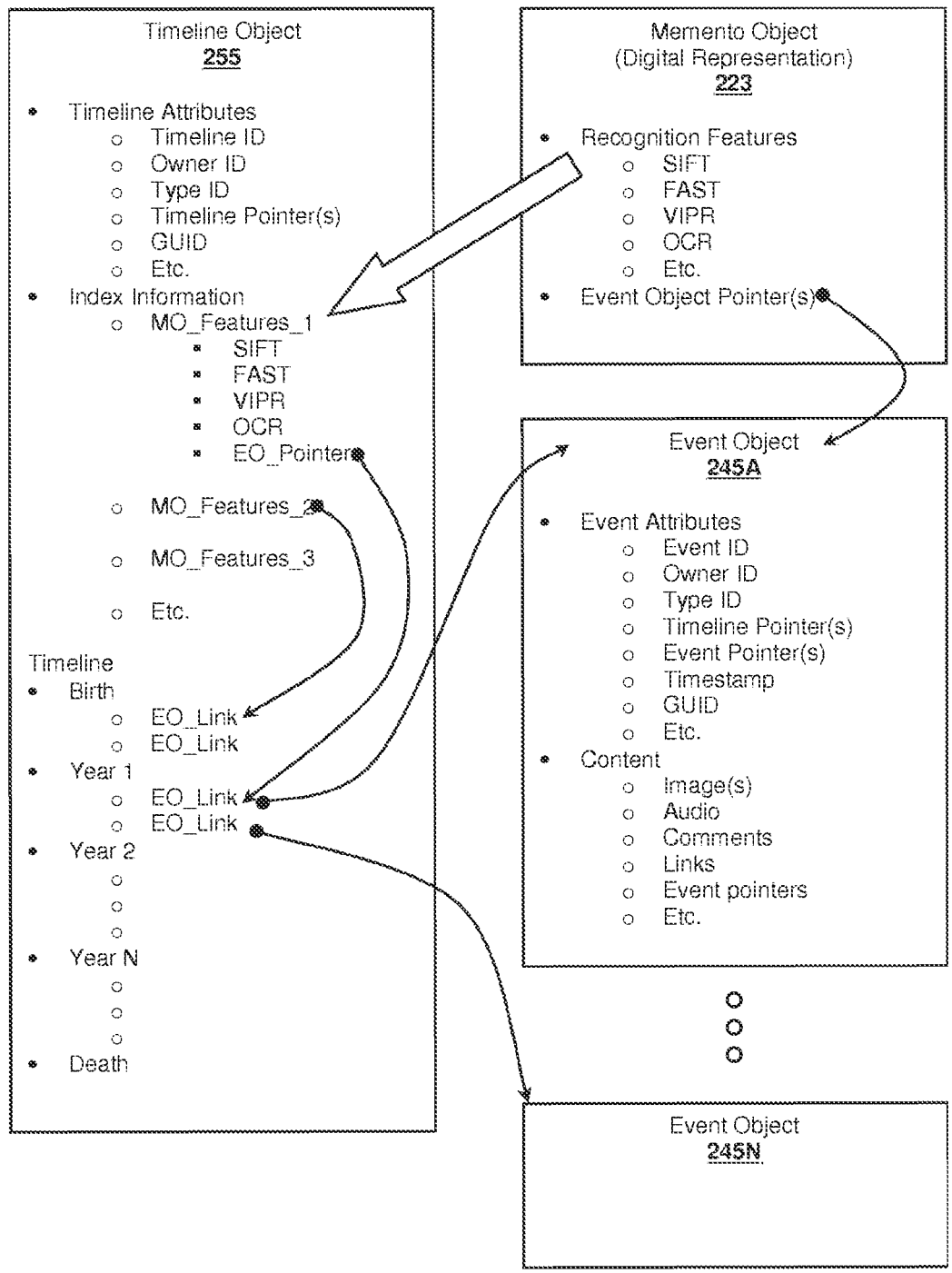
FIG. 2 illustrates links among timelines, mementos, and event objects.

FIG. 2 illustrates a relationship among timeline objects 255, memento object 223, and event objects 245A through 245N, collectively referred to as event objects 245. Timeline object 255 represents events ordered according to time and associated with an entity (e.g., a person, a vehicle, a building, a location, etc.). Timeline object 255 can also be distinct manageable object within the describe ecosystem where timeline objects 255 can be instantiated, moved, copied, forked, deleted, inventoried, or otherwise managed. Further, timeline object 255 or other objects in the system can be stored on a non-transitory computer readable medium.

Timeline object 255 can include numerous features that aid in management of timeline object 255. In some more preferred embodiments, timeline object 255 can include one or more timeline attributes that describe the nature of timeline object 255. Example attributes can include an identifier of the timeline, an owner ID (e.g., username, key, token, etc.), a timeline type identifier (e.g., personal timeline, building timeline, location timeline, etc.), pointers or references to other timelines, user demographics, event object count, time range, location or position, or other attributes. As entities access or manage timeline objects 255, the entity can retrieve timeline objects 255 by submitting one or more queries to timeline databases where the queries can be defined in terms of the timeline attributes. For example, one could retrieve of all timeline objects 255 associated with a set of geo-location coordinates and with males between the ages of 18 to 34.

Timeline objects 255 can further including index information representing one or more sets of recognizable features related to memento objects 223. The indexing information can include various acceptance recognition criteria defined as a function for recognition features where the criteria indicate satisfaction conditions or requirements that should be met to access corresponding event objects. Thus, timeline objects 255 can be considered a mini or micro object recognition database storing sets of recognition features that point to event objects 245. As illustrated, the indexing information can include scale invariant features (e.g., SIFT; see U.S. Pat. No. 6,711,293 to Lowe et al.), corner detecting features (e.g., FAST; see URL www.edwanirosten.com/work/fast.html), visual pattern recognition features (e.g., ViPR®, from Evolution Robotics; vSLAM, see U.S. Pat. No. 7,015,831 to Karlsson; etc.), audio pattern recognition features, optical character recognition features, or other recognition features. Each feature sets can also include one or more pointers that reference a corresponding event object 245 in the timeline. Further, the indexing information can include conditions that should be satisfied in order for an archiving engine to retrieve a corresponding event object.

Timeline objects 255 also include a timeline where events are ordered according to time. In the example show, the timeline represents a person's timeline from birth until death where some events have already been defined. The events within the timeline can be represented as actual data constructs within the timeline or can be externally stored as event objects 245 as illustrated. When event objects 245 are external to timeline object 255, the timeline can be constructed with links or other pointers to event objects 245. For example, the pointers represented by EO_Link could include URLs, URIs, network address, digital object identifiers (DOI), event GUIDs, index key, or other addresses that resolve to a location where corresponding event objects 245 are stored.

In some embodiments timeline object 255 can be instantiated based on a template timeline, possibly corresponding to the type of entity. In such scenarios, the timeline can be a priori created to have proper delineations (e.g., seconds, minutes, hours, days, weeks, months, years, etc.) with place holders for event objects. One should further appreciate that timeline object 255 represents one possible structure for timelines. Alternatives include creating an ordered link list of event objects or creating an order list of pointers to event objects 245.

Event object 245A is presented as a possible structure for event objects. Event object 245A can include event attributes that describe the nature of the corresponding event. Similar to timeline attributes, the event attributes allow various computing device to search for event objects 245 using event attribute-based queries. Example event attributes can include an event ID, event object ID, owner ID, event type ID, pointers or links to related timeline objects, pointers to other event objects, time stamps, location stamps, or other types of attributes. Further event objects 245 can include event content or links to event content. For example, event object 245A might be instantiated with actual content and could include image data, audio data, video data, links to external content, or other types of content data.

Figure 3:
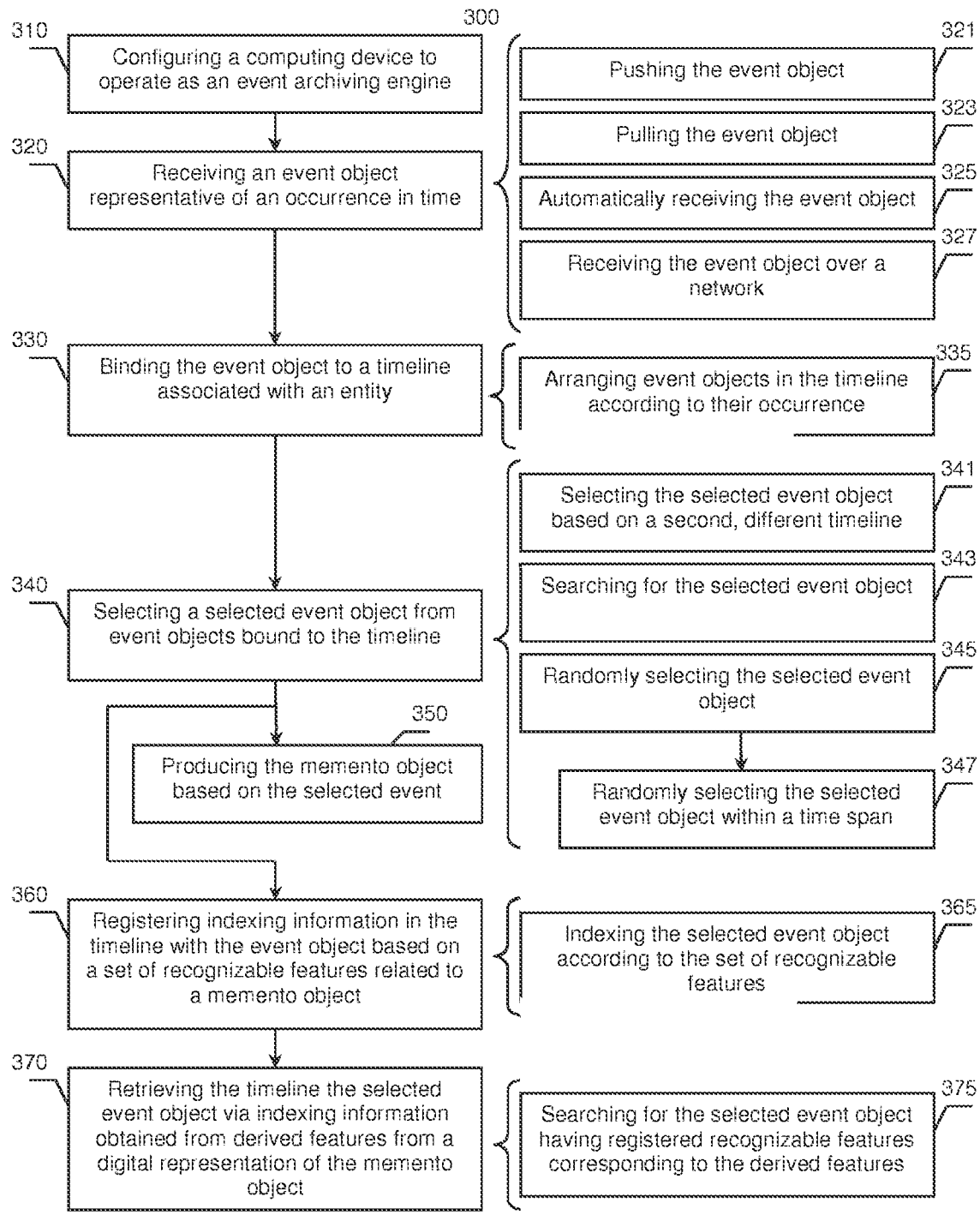
FIG. 3 presents a possible method of retrieving event information based on a memento.

FIG. 3 presents method 300 of retrieving event information where an entity can register sets of recognition features of a memento object with event content. The entity can then use the memento object as a foundation for retrieving the event content. One should appreciate that the memento object represents a real-world physical object that could comprise at least two dimensions (e.g., shadow, images, pictures, paintings, etc.), three dimensions (e.g., action figure, face, ring, moving video, etc.), four dimensions (e.g., moving action figure, moving vehicle, etc.), or more dimensions of relevance.

Step 310 includes configuring a computing device to operate as an event archiving engine. Example computing devices can include servers, workstations, cell phones, kiosks, appliances, vehicles, search engines, CRM systems, or other types of computing devices. The computing device can be configured through installation of one or more sets of instructions within a memory of the computing device where the instructions cause the computing device's processor to execute the various steps of method 300. For example, a cell phone can be configured to operate as a personal event archiving engine by installing a suitably configured app on the cell phone. In other embodiments, a user might use their personal computing device to engage a remote server operating as a for-fee service that archives and retrieves event information. Further the one or more computing devices can be programmed to access at least one of the following interfaces in support of accessing the services of the event archiving engine: an application program interface, a search engine interface, a social network interface, a memory access interface, a cell phone interface, a browser interface, a sensor interface, or other interface through which the engine can be accessed.

Step 320 includes receiving an event object representative an occurrence in time. Example events include a party, a concert, a sporting event, an accident, a medical emergency, an event in a virtual world, a game event, or other type of occurrence. The event object could be obtained through multiple techniques. In some embodiments, the event object is instantiated from event content reflecting the occurrence. In other embodiments, the event object can be retrieved from a database of event objects.

Consider an example where a person wishes to "recall" a sporting event. The person could be presented with multiple choices by which the event archiving engine can receive the event object. As discussed above, event objects can include a media object having various types of multi-media data. Example multi-media data includes audio data, video data, image data, motion data, acceleration data, temperature data, location data, time data, metadata, identification data, preference data, game data, security data, or other types of data. Step 321 could include pushing the event object to event archiving engine. For example, as the person captures images, audio, or other data from the sporting event via their cell phone, the cell phone can package the event data into an event object and push the event object along with its associated event content data to the event archiving engine. Alternatively, step 323 could include the event archiving engine pulling the event object from the cell phone or other computing device. Step 325 could include automatically receiving the event object perhaps based on a contextual query submitted to the event data. One should appreciate that the event objects can be received over a network as suggested by step 327 when necessary or required.

Step 330 includes binding the event object to a timeline associated with an entity where the timeline comprises a plurality of event objects organized according to time. An entity could include a person, an animal, a company, an organization, a group, a family, a school, a yearbook, a building, a vehicle, or other type of entity. The event objects can be bound automatically or manually to the timeline possibly through a user interface. Each timeline can include time demarcations based on a life time, a life stage, a year, a month, a week, a day, an hour, or other temporal segmentation. Consider a scenario where a person's tablet computer operates as a personal witness (e.g., event archiving engine) that automatically constructs a witnessed timeline object, perhaps on a daily basis. Throughout the days, weeks, or months, the tablet captures images of the person's events. The tablet can use the images to create event objects and automatically construct a timeline by binding the images as event objects to the witnessed timeline object. As the event objects arrive, the tablet can arrange the event objects in the timeline according to their occurrence as suggested by step 335. Thus, the timeline object builds up a time-ordered, or even possibly space ordered, list of events. Further, the engine can bind the event objects to multiple timelines perhaps based on recognizing object within the event object's event content data. As an example, the event object could include an image or picture of several friends. The event archiving engine operating as a recognition platform can recognize the face of each friend and then bind the event object with the image to each recognized person's timeline.

In preparation for registering an event object with a memento, step 340 includes selecting a selected event object from event objects bound to the timeline. One should appreciate that the selected event object could be a priori independent of the timeline before selection. Thus, step 330 could occur after the selection process of step 340. The event object can be selected through various techniques. Typically a user will cause the event object to be instantiated based on event content data (e.g., images, audio, video, temperature, biometrics, etc.). Further, a user or other entity could search for the event object as suggested by step 343. For example, the timeline might include many a priori bound event objects. At a later time, the user can search for event objects within the timeline having specified time stamps, content, or other required attributes.

It is also contemplated that the selected event object can be selected based on a second, different timeline as suggested by step 341. Consider a scenario where two individuals have separate, distinct timelines and participate in a common event; a medical emergency for example. Both individuals might create event objects in their respective timelines. One individual might wish to create a recallable event based on an image of a scar incurred and wish to select events based event objects that overlap among the two timelines. Such an approach would be considered advantageous when constructing a medical timeline shared between a patient and a healthcare provider.

It is contemplated that some timelines will comprise many event objects having substantially similar timestamps associated with an event. For example, a birthday party could include hundreds of pictures taken within an short time span. In such circumstances, step 345 can include randomly selecting the selected event object possibly from a set of available event objects. Additionally, the selected event object could be selected based on additional criteria that could further limit the set of available event objects. Perhaps the selected event object is selected from event objects within a specified time span on the time line as suggested by step 347. Referring back to the birthday example, the user might specify a time span of around a particularly interesting sub-event (e.g., blowing out the candles, opening presents, etc.). The time span can be defined based on a relative time (e.g., plus or minus around a time point) or based on an absolute time (e.g., from a beginning time to an end time).

Step 360 can include registering indexing information in the timeline with the selected event object based on a set of recognizable features related to a memento object. The set of recognizable features can be consider one or more indices by which the selected event object can be retrieved from the timeline. The set of recognizable features can be derived from applying one or more algorithms to a digital representation of the memento object. For image data within the digital representation example algorithms could include SIFT, FAST, ViPR, BRISK, OCR, or other image processing algorithms. Video data could be processed by similar image processing algorithms, vSLAM, Video Content Analysis (see "Two novel motion-based algorithms for surveillance video analysis on embedded platforms prohibited" by Vijverberg et al.: see URL dx.doi.org/10.1117/12.851371), or other video processing algorithms. Features from audio data in the digital representation can be extracted based on automatic speech recognition (ASR) using Dynamic Time Warping. Hidden Markov models, neural networks, or other algorithms. It should be appreciated that the set of recognizable features can comprise features that align with the various modalities of the digital representation of the memento object. The set of recognizable features can include audio data characteristics, image data characteristics, color, shape, dimension of relevance, make, model, encoded data, non-encoded information, texture, or other information derivable from a digital representation. Thus, the set of recognizable features could be represented as a vector where each member of the vector represents a different modality (e.g., image, audio, video, spatial, temporal, temperature, etc.). Further each member of the vector could include a listing of relevant features. The set of recognizable features can also include one or more criterion that should be satisfied with respect to the features to determine a successful recognition "hit". For example, if only image data is used to represent to memento object where the set of features only comprise SIFT features, then the recognition criteria might require that at least 75% of the features in must be present for the memento object to be recognized and trigger retrieval of corresponding event objects. The recognition criteria can be automatically determined by the event archiving engine, by the user, or other techniques.

Step 365 can include indexing the selected event object according to the set of recognizable features. The selected event object can be indexed by storing the selected event object within an event database by using the one or more members of the set of recognizable features as an index. Additionally, the timeline can be updated with the set of recognizable features as an index in manner were the timeline itself, at least as some level, operates as a small recognition database and retrieves event objects based on the event archiving engine encountering similar recognizable features. The selected event objects can be integrated into the timeline or can be referenced by the timeline through a pointer or link (e.g., network address, GUID, etc.).

Step 370 includes retrieving from the timeline the selected event object via the indexing information obtained at least in part from at least one derived feature derived from a digital representation of the memento object where the derived feature corresponds to a recognizable feature in the set of recognizable features. For example, at a later time when an entity wishes to recall or remember the event object, they can capture a new digital representation of the memento object to which the event object has been registered. The archiving engine applies one or more algorithms (e.g., SIFT, BRISK. FAST, vSLAM, etc.) to the new digital representation to obtain one or more derived feature. Similar to the recognizable features, the derived features can include audio data characteristics, image data characteristics, color, shape, dimension of relevance, make, model, encoded data, non-encoded information, attributes, texture, location, time, or other feature derivable from the new digital representation. The engine then uses the one or more derived feature to query the timeline for registered event objects that have been indexed based on similar recognizable features. In some embodiments, as suggested by step 375, the timeline can be considered to configure the event archiving engine as an event searching engine that searches the timeline for event objects having registered recognizable features corresponding to the derived feature. Thus, the event archiving engine is able to "recall" or "remember" event objects based on the memento. One should appreciate that the indexing information used to retrieve event objects relate to the memento objects rather than the content of the event object itself.

Step 350 can optionally includes producing the memento object based on the selected event object. In some embodiments, the event archiving engine can offer one or more recommendations for suggested memento objects. For example, as the event archiving engine receives event content data, perhaps image data, the archiving engine can select one or more images to construct a real-world object. Perhaps the image data can be used to create photograph, a key chain, an image, a card, a figurine, a device, a moving object (e.g., action figure, bobble head, etc.) or other physical item that can be sent to the user. Such an approach is considered advantageous because it allows an entity to tailor or customize their memento to a specific event to strengthen the memory.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A computer-based method for sharing social media, comprising:
    obtaining, by a first device application associated with a first device, image data captured in real time by a first user of the first device an associated time value, and location data associated with the first device;
    identifying, by the first device application associated with the first device, one or more recognizable visual features in at least one portion of the image data via execution of at least one algorithm on the image data;
    generating, in at least one memory, an event object based on the one or more recognizable visual features in the at least one portion of the image data, wherein the event object comprises the at least one portion of the image data, the associated time value, the location data, and metadata associated with the one or more recognizable visual features related to the image data, wherein the metadata comprises at least one media or multimedia object and is generated by the first device application in response to a user input of the first user;
    transmitting, over a network, the event object from the first device application to a second device application associated with a second device;
    storing the event object by the second device application in a database, wherein the event object is retrievable based on at least one of the associated time value and the location data;
    retrieving over the network from the database, the event object by a third device application associated with a third device wherein the first user has enabled a second user of the third device to access the event object based on a specified time interval and a location range selected by the second user of the third device application, wherein the location data and associated time value of the event object satisfy selection criteria based on the location range and the specified time interval;
    presenting the event object to the user of the third device application through display of the image data on the third device in association with the at least one media or multimedia object for a time period that does not exceed a maximum time period specified by the first user.

2. The method of claim 1, wherein the metadata is at least one of the following types of data: game data, preference data, motion data, acceleration data, sensor data, audio data, time data, identification data, position data, count data, location data, user data, sensor feed data, and properties data.

3. The method of claim 1, wherein the metadata is comprised of user-supplied data.

4. The method of claim 1, wherein the event object represents one of the following types of events: a sporting event, a concert event, a virtual world event, a news event, and a game event.

5. The method of claim 1, wherein the event object is comprised of at least one of the following types of media: a video, an audio file and an image.

6. The method of claim 1, wherein the first device and the third device are the same device.

7. The method of claim 1, wherein the first device is one of the following device types: a cell phone, a tablet, a smart phone and a personal computer.

8. The method of claim 1, further comprising removing the event object from the database after a predetermined period of time has elapsed.

9. The method of claim 1, further comprising removing the event object from the database upon the request of a second user.

10. The method of claim 1, wherein the event object is associated with at least one of the following: a building, a place, a school, a venue, and a company.

11. The method of claim 1, wherein the second device application comprises a database application.

12. The method of claim 1, wherein the second device application is operating as one or more of following computer-based services: Platform-as-a-Service (PaaS), Infrastructure-as-a-Service (IaaS) and Software-as-a-Service (SaaS).

13. The method of claim 1, wherein the database stores the event object indexed by the associated time value.

14. The method of claim 1, wherein the specified time interval is defined by the user of the third device application.

15. The method of claim 1, wherein the specified time interval is based on a relative time.

16. The method of claim 1, wherein the location data comprises location data acquired from a GPS sensor.

17. The method of claim 1, wherein the image data is comprised of one or more data modalities from at least one sensor.

18. The method of claim 1, further comprising producing a new real-world object based on the event object.

19. The method of claim 1, wherein the event object retrieved by the third device application is randomly selected from the database from a plurality of event objects having location data and associated time values satisfying the selection criteria based on the location range and the specific time interval.

20. The method of claim 1, wherein the at least one algorithm is comprised of an image processing algorithm and an audio processing algorithm.

21. The method of claim 1, wherein the at least one algorithm comprises an image processing algorithm, and wherein the image processing algorithm comprises of one or more of the following: SIFT, FAST, ViPR, BRISK, OCR and vSLAM.

22. The method of claim 1, wherein the at least one algorithm comprises an audio processing algorithm, wherein the audio processing algorithm comprises of one or more of the following: automatic speech recognition (ASR), Dynamic Time Warping, Hidden Markov models, and neural networks.

23. A computer program product for sharing social media, comprising a non-transitory computer readable medium storing one or more computer readable instructions executable on one or more computer processors, the one or more computer readable instructions comprising:

obtaining, by a first device application associated with a first device, image data captured in real time by a first user of the first device, an associated time value, and location data associated with the first device;

identifying, by the first device application associated with the first device, one or more recognizable visual features in at least one portion of the image data via execution of at least one algorithm on the image data;

generating, in at least one memory, an event object based on the one or more recognizable visual features in the at least one portion of the image data, wherein the event object comprises the at least one portion of the image data, the associated time value, the location data, and metadata associated with the one or more recognizable features, wherein the metadata comprises at least one media or multimedia object and is generated by the first device application in response to a user input of the first user;

transmitting, over a network, the event object from the first device application to a second device application associated with a second device;

storing the event object by the second device application in a database, wherein the event object is retrievable based on at least one of the associated time value and the location data;

retrieving, over the network from the database, the event object by a third device application associated with a third device wherein the first user has enabled a second user of the third device to access the event object, based on a specified time interval and a location range selected by a user of the third device application, wherein the location data and associated time value of the event object satisfy selection criteria based on the location range and the specified time interval;

presenting the event object to the user of the third device application through display of the image data on the third device in association with the at least one media or multimedia object for a time period that does not exceed a maximum time period specified by the first user.

24. A system for sharing social media comprising:
a database comprising a plurality of event objects;
an event archiving engine comprising a processor operably connected to the database and configured to communicate over a network with a plurality of devices;
a first device application associated with a first device of the plurality of devices, the first device application configured for:
obtaining image data captured in real time by a first user of the first device, a time value associated with the image data, and location data associated with the first device;
identifying one or more recognizable visual features in at least one portion of the image data via execution of at least one algorithm on the image data;
generating an event object based on the one or more recognizable visual features in the at least one portion of the image data, wherein the event object comprises the at least one portion of the image data, the associated time value, the location data, and metadata associated with the one or more recognizable visual features wherein the metadata comprises at least one media or multimedia object and is generated by the first device application in response to a user selection of the first user; and
transmitting the event object over the network to a second device of the plurality of devices wherein the second device comprises the event archiving engine;
a second device application associated with the second device, the second device application configured for receiving the event object from the network and storing the event object in the database, wherein the event object is retrievable from the database based on at least one of the associated time value and the location data; and
a third device application associated with a third device of the plurality of devices, the third device application configured for:
retrieving the event object over the network from the database wherein the first user has enabled a second user of the third device to access the event object based on a specified time interval and a location range selected by a second user of the third device application, wherein the location data and associated time value of the event object satisfy selection criteria based on the location range and the specified time interval; and
presenting the event object to the user of the third device application through display of the image data on the third device is association with the at least one media or multimedia object for a time period that does not exceed the maximum time period specified by the first user.

* * * * *